(12) United States Patent
Zhu et al.

(10) Patent No.: US 10,638,482 B2
(45) Date of Patent: Apr. 28, 2020

(54) METHODS AND APPARATUSES FOR DYNAMIC BEAM PAIR DETERMINATION

(71) Applicant: QUALCOMM Incorporated, San Diego, CA (US)

(72) Inventors: Jun Zhu, San Diego, CA (US); Raghu Narayan Challa, San Diego, CA (US); Assaf Touboul, Netanya (IL); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/843,778

(22) Filed: Dec. 15, 2017

(65) Prior Publication Data
US 2019/0191425 A1   Jun. 20, 2019

(51) Int. Cl.
| | | |
|---|---|---|
| *H04W 72/04* | (2009.01) | |
| *H04B 7/06* | (2006.01) | |
| *H04B 7/08* | (2006.01) | |
| *G06N 3/08* | (2006.01) | |

(52) U.S. Cl.
CPC ............ *H04W 72/046* (2013.01); *G06N 3/08* (2013.01); *H04B 7/0695* (2013.01); *H04B 7/088* (2013.01)

(58) Field of Classification Search
None
See application file for complete search history.

(56) References Cited

U.S. PATENT DOCUMENTS

| | | | | |
|---|---|---|---|---|
| 5,598,354 A | * | 1/1997 | Fang | G06N 3/0454 708/203 |
| 7,284,769 B2 | * | 10/2007 | Breed | B60R 21/0132 180/282 |
| 9,866,286 B1 | * | 1/2018 | Qu | G01S 17/894 |
| 10,090,887 B1 | * | 10/2018 | Rofougaran | H02J 50/50 |
| 10,366,621 B2 | * | 7/2019 | Vanderwende | G09B 7/00 |
| 2002/0184171 A1 | * | 12/2002 | McClanahan | G06K 9/4652 706/20 |
| 2004/0036261 A1 | * | 2/2004 | Breed | B60C 11/24 280/735 |
| 2004/0204114 A1 | * | 10/2004 | Brennan | H04B 7/04 455/562.1 |

(Continued)

FOREIGN PATENT DOCUMENTS

WO    2004042983 A2    5/2004

OTHER PUBLICATIONS

International Search Report and Written Opinion—PCT/US2018/065359—ISA/EPO—dated Mar. 20, 2019.

*Primary Examiner* — Andrew C Oh
(74) *Attorney, Agent, or Firm* — Qualcomm Incorporated

(57) ABSTRACT

The choice of a transmit (Tx)-Receive (Rx) beam pair out of many available beam pairs between a base station and a millimeter wave (mmW)-capable UE is directly related to the performance of transmission between the base station and the UE. A method, apparatus, and computer-readable medium at a transmitting user equipment (UE) capable of (mmW) communication are disclosed to determine a new serving Tx-Rx beam pair using an artificial neural network. The UE may predict a set of good Tx-Rx beam pairs using the artificial neural network, wherein the artificial neural network comprises an input layer, a middle layer, and an output layer. The UE may then determine the new serving Tx-Rx beam pair based on the set of good Tx-Rx beam pairs.

30 Claims, 11 Drawing Sheets

(56) References Cited

U.S. PATENT DOCUMENTS

| | | | |
|---|---|---|---|
| 2013/0095846 A1 | 4/2013 | Brisebois et al. | |
| 2016/0269964 A1* | 9/2016 | Murray | H04W 36/08 |
| 2016/0330643 A1 | 11/2016 | Sahin et al. | |
| 2016/0373175 A1* | 12/2016 | Harrison | H04B 7/0469 |
| 2017/0132801 A1* | 5/2017 | Trenholm | H04N 5/372 |
| 2017/0223552 A1* | 8/2017 | Roy | H04W 16/28 |
| 2017/0238294 A1* | 8/2017 | Lim | H04B 7/0695 |
| | | | 370/277 |
| 2017/0270407 A1 | 9/2017 | Alberti et al. | |
| 2017/0311276 A1* | 10/2017 | Tsai | H04B 7/0617 |
| 2017/0331670 A1* | 11/2017 | Parkvall | H04L 41/0816 |
| 2017/0346544 A1* | 11/2017 | Islam | H04B 7/0404 |
| 2018/0020363 A1* | 1/2018 | Faxer | H04L 5/005 |
| 2018/0132116 A1* | 5/2018 | Shekhar | H01Q 1/246 |
| 2018/0249453 A1* | 8/2018 | Nagaraja | H04W 48/20 |
| 2018/0279286 A1* | 9/2018 | Akoum | H04W 74/0833 |
| 2019/0007122 A1* | 1/2019 | Furuskog | H04W 36/305 |
| 2019/0025400 A1* | 1/2019 | Venalainen | G01S 3/8083 |
| 2019/0034483 A1* | 1/2019 | Millius | G06F 16/335 |
| 2019/0035271 A1* | 1/2019 | Jain | G06K 9/00791 |
| 2019/0074891 A1* | 3/2019 | Kwon | H04B 7/0695 |
| 2019/0097712 A1* | 3/2019 | Singh | H04B 7/08 |
| 2019/0191425 A1* | 6/2019 | Zhu | G06N 3/08 |

* cited by examiner

METHODS AND APPARATUSES FOR DYNAMIC BEAM PAIR DETERMINATION

BACKGROUND

Field

The present disclosure relates generally to wireless communication systems, and more particularly, to a methods and apparatuses for dynamic beam pair selection.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Wireless communication systems may also include, or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may be used between vehicles to improve the safety of self-driving cars.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The choice of a transmit (Tx)-Receive (Rx) beam pair out of many available beam pairs between a base station and a mmW-capable UE is directly related to the performance of transmission between the base station and the UE. A currently prevalent approach to selecting an active Tx-Rx beam pair is to measure each beam pair from multiple available beam pairs in a round-robin manner and to determine a new serving beam pair based on the measurement results. In this round-robin manner, every beam pair has equal opportunity to be measured in a synchronization cycle. In fact, due to factors such as line of sight (LoS) and proximity between the beam pairs, chances for the beam pairs to be selected as the serving beam pair are different. The round robin approach does not distinguish among the beam pairs and thus may result in long latency in selecting the serving beam pair.

Thus, there is a need for a method, apparatus, and computer-readable medium at a user equipment (UE) in a mmW communications environment to stochastically assign an opportunity to each beam pair, taking into consideration factors such as LoS, proximity, among others, to quickly converge on one good serving beam pair, using an artificial neural network. The UE may predict a set of good Tx-Rx beam pairs using the artificial neural network. The artificial neural network may include an input layer, a middle layer, and an output layer. The UE may then determine the new serving Tx-Rx beam pair based on the set of good Tx-Rx beam pairs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
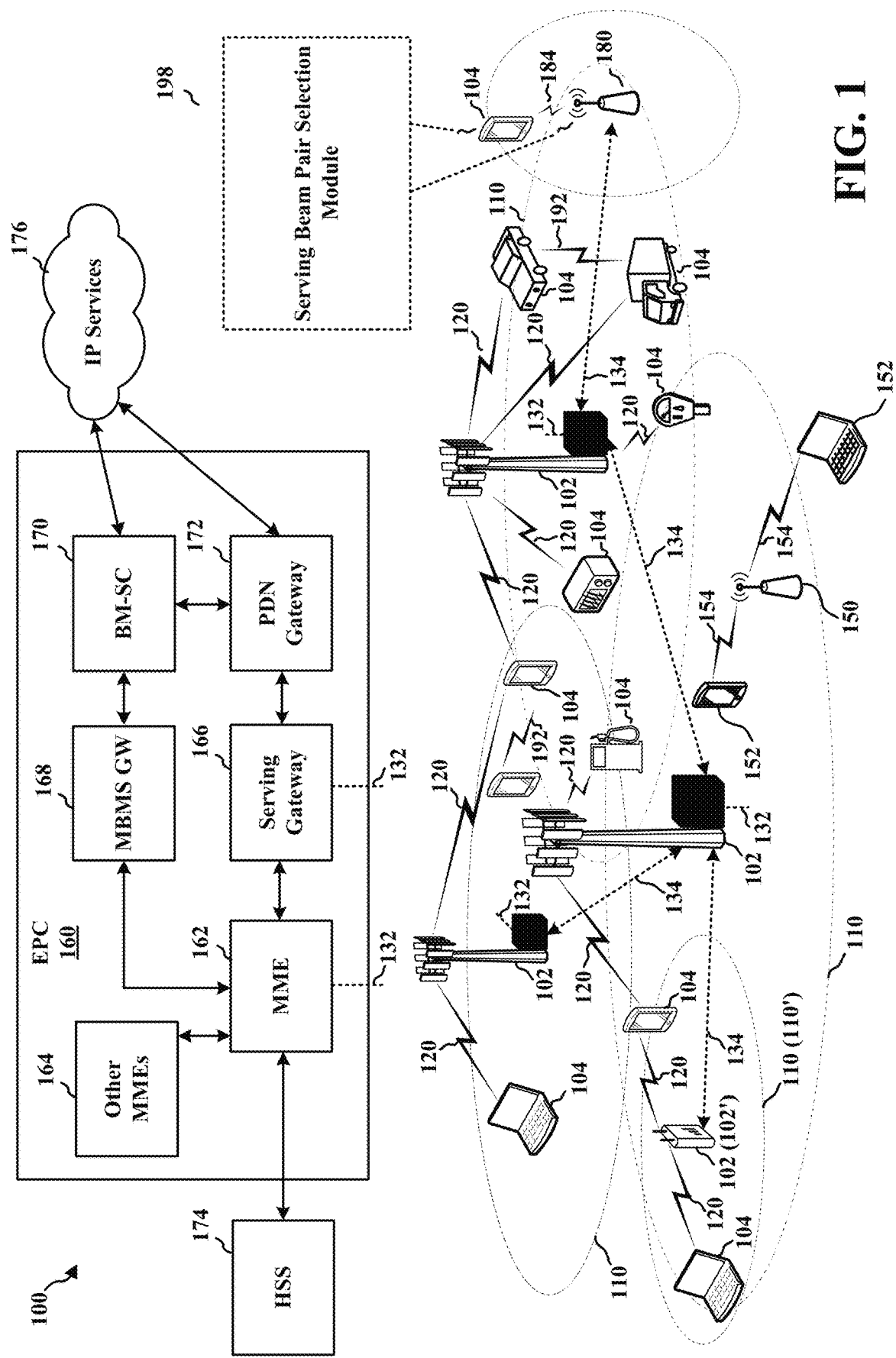
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104s may be configured to include a serving beam pair selection component (198) that enables the UEs 104 to determine a serving beam pair among multiple beam pairs efficiently. This in turn enables the UE to set up a link between the UE and the base station with minimal latency, especially in a dynamical environment, where the UE is in a fast motion and the current serving beam pair may need frequent updating.

Figure 2:
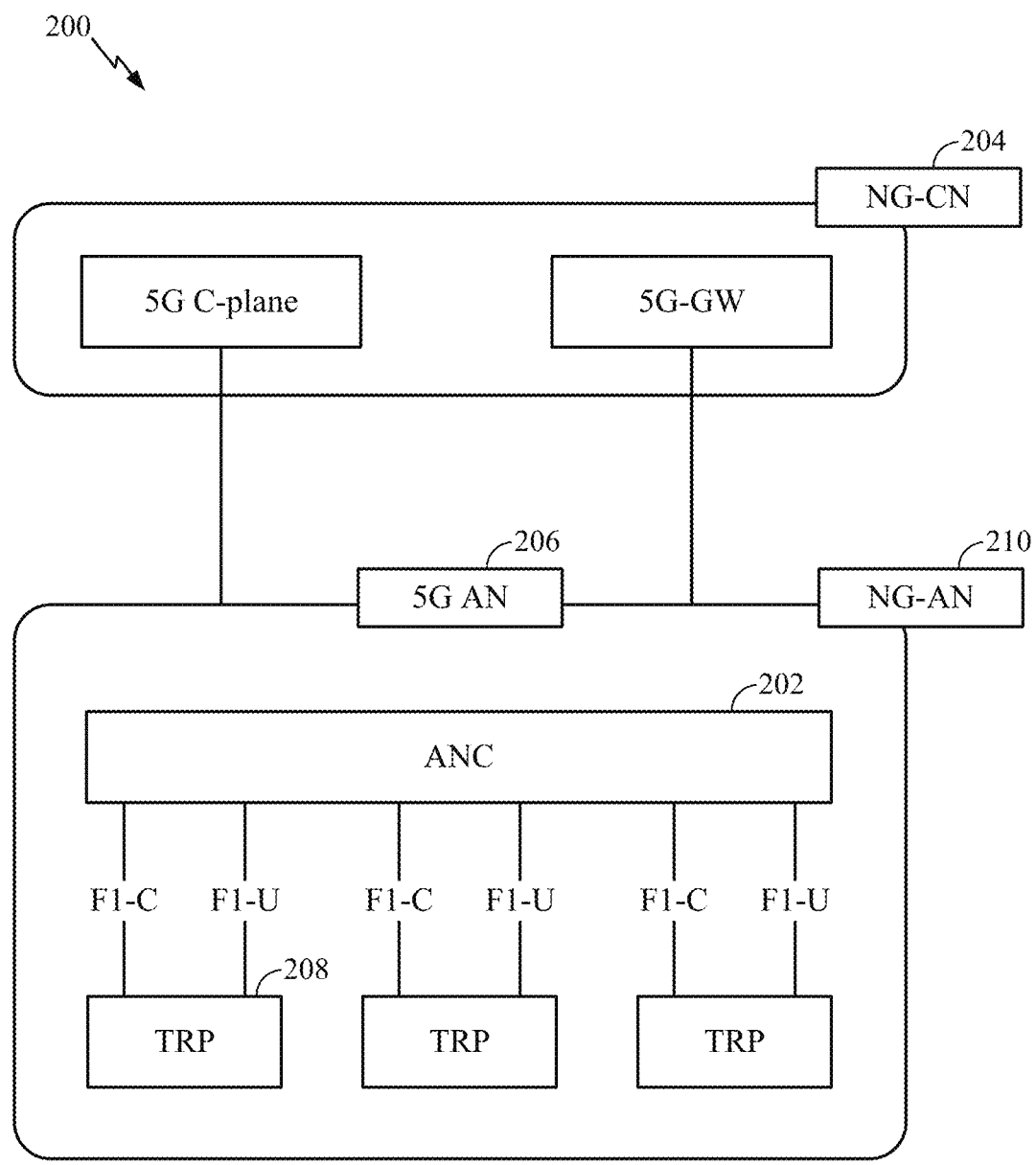
FIG. 2 illustrates an example logical architecture of a distributed radio access network.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. In one example aspect, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
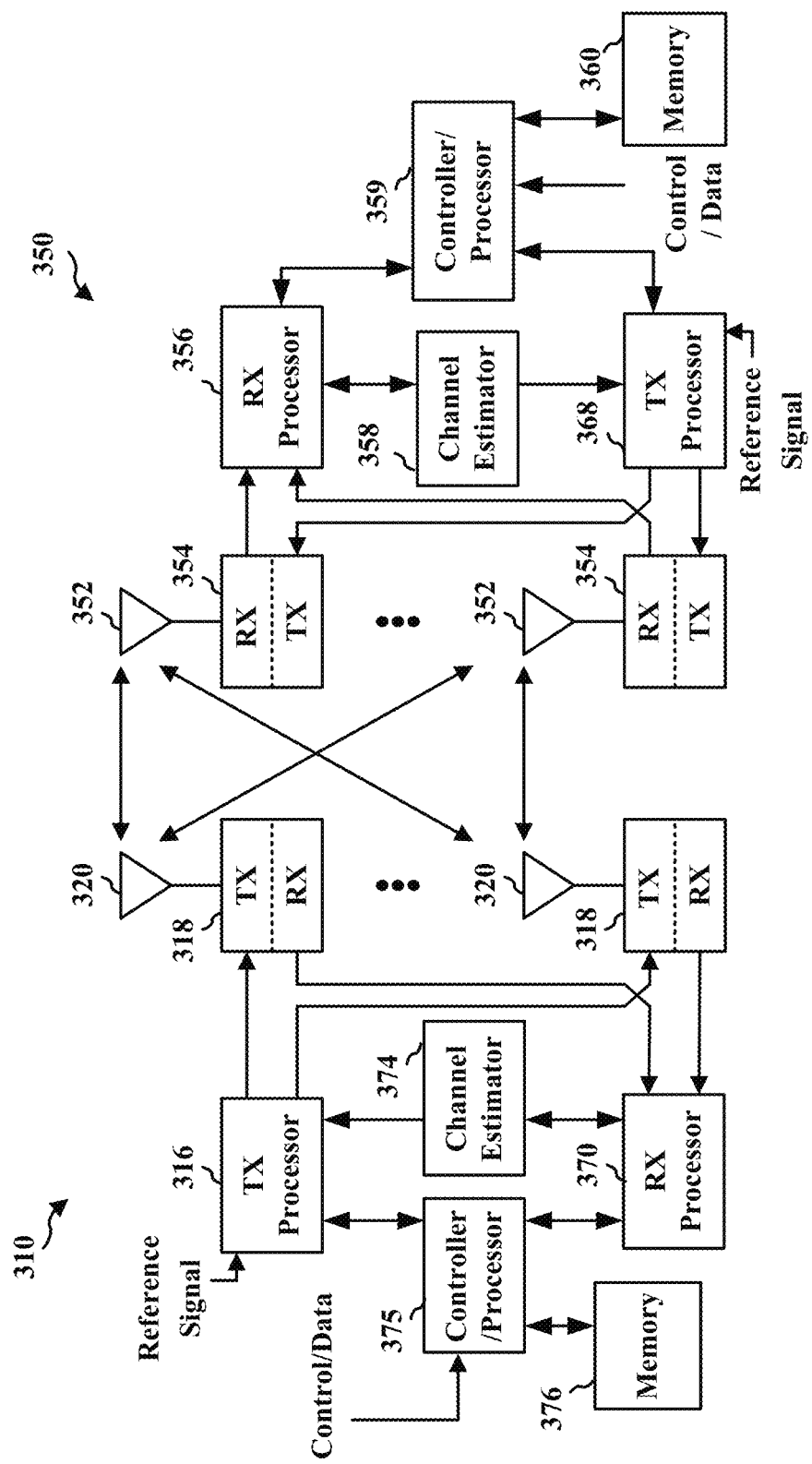
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
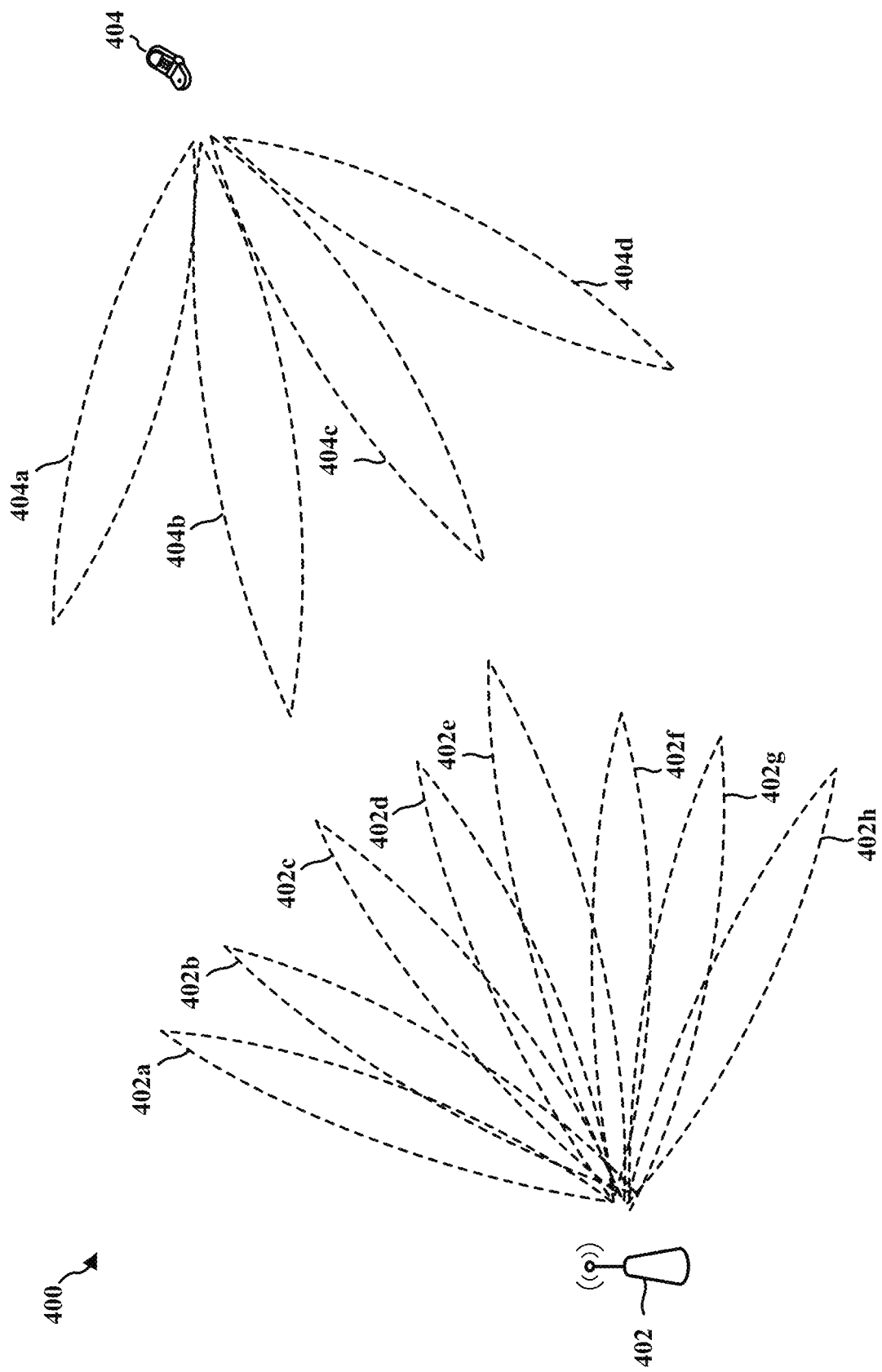
FIG. 4 is a diagram illustrating a base station in communication with a UE in accordance with one or more aspects of the present disclosure.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5A:
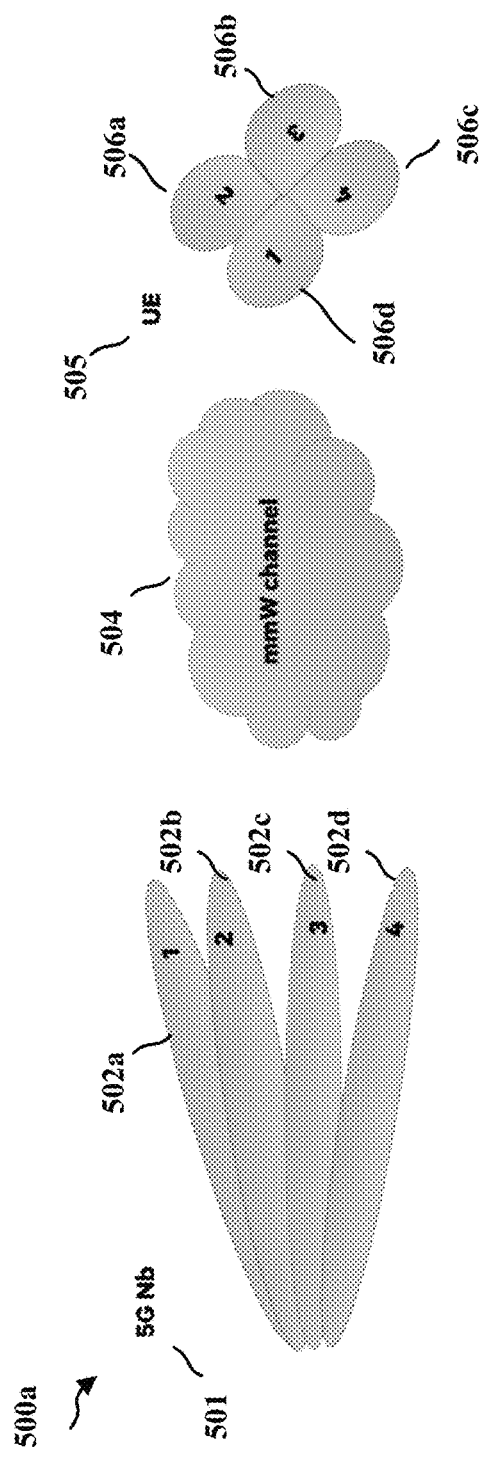
FIG. 5A is a diagram illustrating a base station in communication with a UE in accordance with one or more aspects of the present disclosure.

FIG. 5a is a diagram 500a illustrating a base station 501 in communication with a UE 505, in accordance with one or more aspects of the present disclosure. The diagram 500a shows a set of transmit beam 502a-502d at a 5G base station and a set of receive beam 506a-506d at the UE. One of the transmit beams 502a-502d may pair up with one of the receive beam 506a-506d to form a serving Tx-Rx beam pair to carry a signal through a millimeter wave channel 504 between the base station 501 and the UE 505.

In one example aspect, before any communication between 5G mmW base station 501 and the UE 505, the base station 501 may first broadcast all 4 (Tx) beams 1-4 or 502a-502d in a beam reference signal (BRS) cycle to all the devices in the transmission range. The UE 505 in turn pairs up the received Tx beams with its Rx beams to find the most suitable beam pair for transmissions between the UE 505 and the base station 501. Larger the number of Tx beams and number of Rx beams are, longer it may take to find the most suitable beam pair, or a new serving beam pair. In the diagram 500, there are 4 Tx beams and 4 Rx beams. That is, the size of Tx beams and Rx beams are M=4, and N=4 respectively.

A BRS cycle is a synchronization cycle which may include a predetermined number of synchronization periods. Different terms may be used for a synchronization period. For example, a synchronization period may be referred to as a synchronization frame (SF). During a synchronization frame, a number of candidate Tx-Rx beam pairs may be selected and measured for determining the new serving Tx-Rx beam pair. For example, in one SF, each of Tx beams may be paired with one of the Rx beams to form a candidate Tx-Rx beam pair sequence for beam pair measurement, if the selection method is to allow Tx beams to vary. To select a reasonably stable serving beam pair, predetermined number of synchronization cycles may be needed.

The quality of a candidate Tx-Rx beam pair, in one aspect, may be measured in terms of beam gain. Several factors may affect the measured beam gain of a candidate beam pair, including line of sight (LoS) or non-line of sight (NLoS). In general, a beam pair with LoS has a better beam gain than a beam pair with NLoS, provided everything else being equal.

In one example aspect, during one synchronization cycle, all Tx beams are expected to emit in a fixed pattern, because a base station may not change its location frequently. Referring to FIG. 5a again, the Tx-Rx beam pair (2,1) and the Tx-Rx beam pair (3,1) are expected to have better beam gains because Rx beam 1 has at least partial LoS with the Tx beams 2 and 3, if only LoS is considered for beam gain measurements.

Figure 5B:
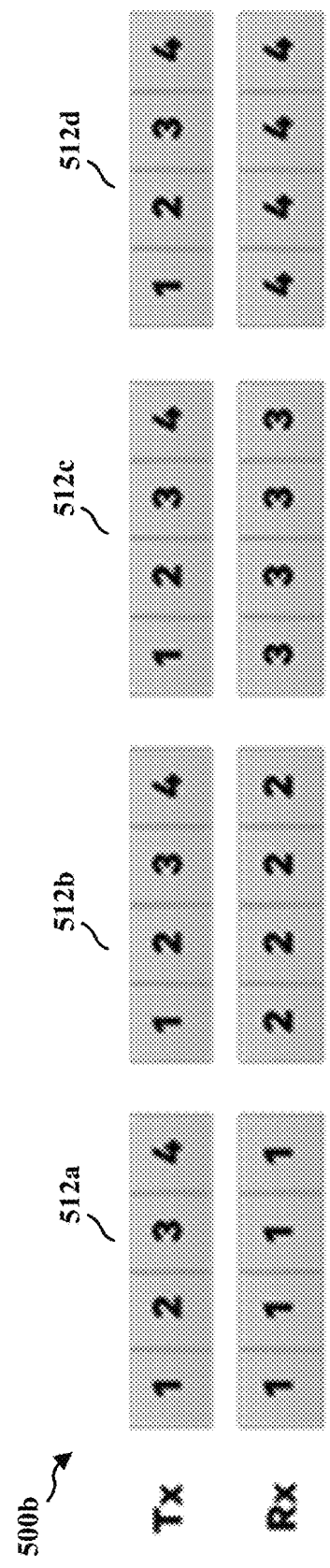
FIG. 5B illustrates example sequence of beam pairs for measurement, in accordance with one or more aspects of the present disclosure.

FIG. 5b illustrates an example sequence 500b of Tx-Rx beams pairs, in accordance with one or more aspects of the present disclosure. Based on the Tx-Rx beam pairs of FIG. 5a, FIG. 5b illustrates a sequence of beam pairs for measurement based on a round-robin approach. The example sequence 500b illustrates a synchronization cycle or BRS cycle that includes 4 synchronization frames 512a-512d. According to the round robin approach, one of the Rx beams is selected sequentially to pair with each of Tx beams within a SF to form M candidate beam pairs for beam gain measurement, M being the size of Tx beam set. As shown in FIG. 5b, during the SF 512a, the Rx beam 1 is paired with each of the 4 Tx beams 1 through 4, for measurement, and then next Rx beam, Rx beam 2, is paired with each of the 4 Tx beams 1 through 4 for measurement. All N Rx beams are measured in a round-robin fashion.

According to the existing approach, it normally requires at least a complete BRS cycle for all Rx beams to be paired with Tx beams for beam gain measurement to find a new serving Tx-Rx beam pair. As a UE may have more than one Rx beams, it may take a number of BRS cycles before finding a good serving beam pair. This may result in a non-trivial latency and undesirable delay in establishing a connection between the base station and the UE. Based on the round-robin approach to determining a new serving Tx-Rx beam pair, the length of latency is proportional to the number of Rx beams.

Thus, the existing round-robin approach likely wastes synchronization SF resources, in part because some of the beam pair may have little or zero chance to be selected as the new serving beam pair, due to their directions, lack of LoS or other factors. For example, referring to both FIG. 5a and FIG. 5b, Tx beam 2 and 3 should see more gains than 1 and 4, if LoS is assumed. Accordingly, assigning the 4 Tx beams the same equal opportunity for measurement in one BRS cycle may not be necessary and may be wasteful.

Figure 6:
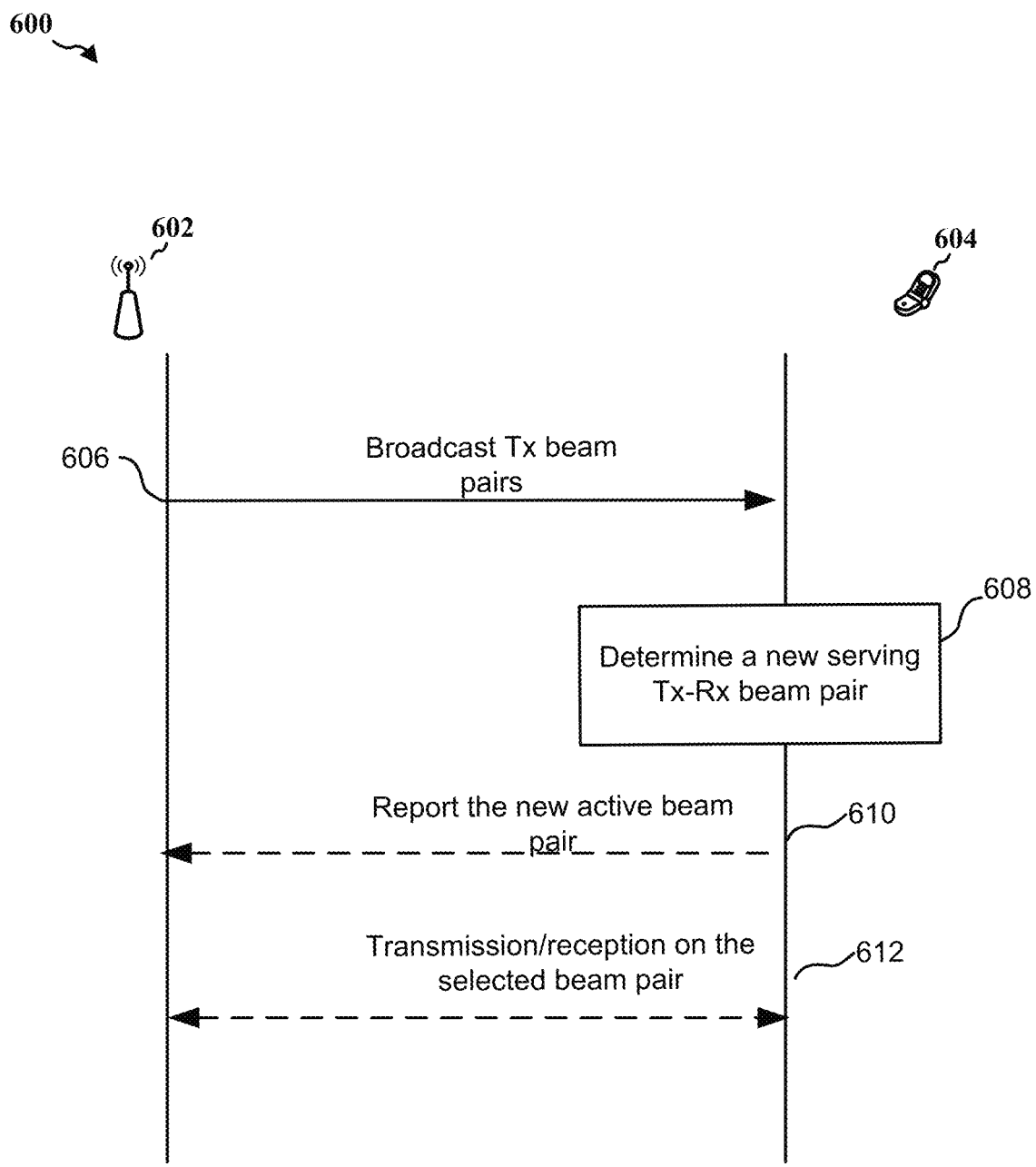
FIG. 6 illustrates an example of a wireless communications system that supports dynamic stochastic beam selection in accordance with one or more aspects of the present disclosure.

FIG. 6 illustrates an example of a wireless communications system 600 that supports an artificial neural network (ANN) based approach to determining a new serving beam pair in accordance with one or more aspects of the present disclosure. The wireless communications system 600 includes a base station 602 and a UE 604. At 606, the base station 602 broadcast all Tx beams available at the base station 602.

At 608, the UE 606 may employ the ANN to predict a set of good beam pairs, based on the acquired learning of the ANN and then determine a new serving beam pair based on the predicted set of good beam pairs. This may result in an improved latency in finding a suitable serving beam pair and establishing a connection between the base station and the UE. The details of the ANN-based approach to beam pair selection method are shown in FIGS. 7, 8, 9, and 10 and described in the corresponding sections of the present disclosure.

At 610, the UE 604 reports the new serving beam pair to the base station 602. Then at 612, the UE 604 and base station 602 may commence using the determined serving beam pair.

Figure 7:
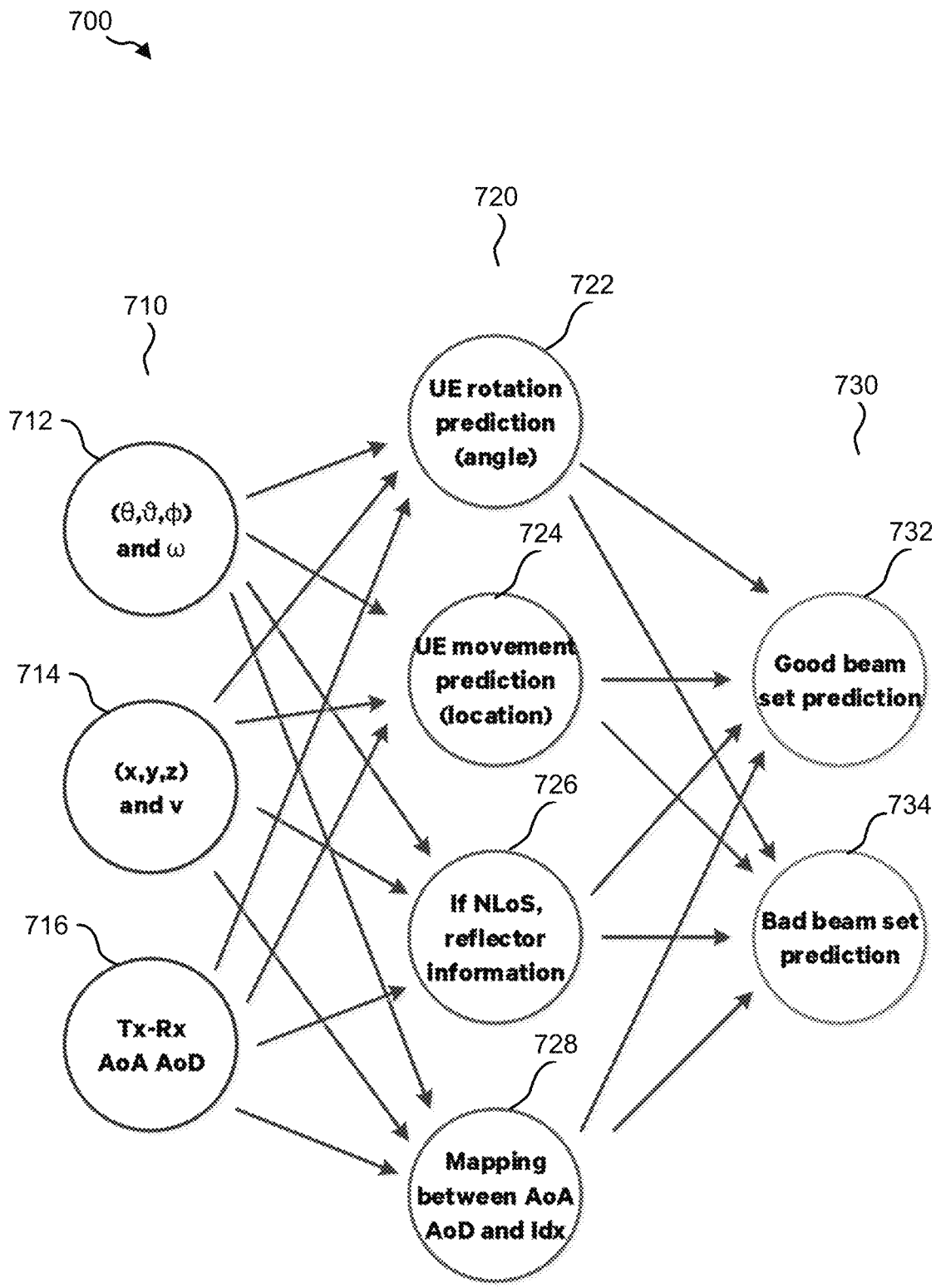
FIG. 7 is an artificial neural network in accordance with one or more aspects of the present disclosure.

FIG. 7 illustrates an artificial neural network (ANN) 700 in accordance with one or more aspects of the present disclosure. The ANN 700 may be employed and invoked by one of the UEs 104 of FIG. 1, the UE 350 of FIG. 3, the UE 604 of FIG. 6, or apparatus 1002/1002' of FIGS. 10 and 11.

The ANN 700 may be used to predict which set of beam pairs will become good in the near future, by employing a 3-layer based machine learning technique. The cost function of the ANN 700 is to maximize the estimated/predicted beam strength in terms of beam reference signal received power (BRSRP), signal noise ratio (SNR), and spectral efficiency, among others.

The three layers of the ANN 700 include an input layer 710, a middle layer 720, and an output layer 730. In one example aspect, the ANN 700 is a feedforward artificial neural network and the middle layer 720 sometime is also termed a hidden layer. In another aspect, the ANN 700 may be another type of artificial neural network, such as a feedback artificial neural network, or a combination thereof.

In one example aspect, the input layer 710 may include a neural input node 712 for UE self-rotation angles($\theta$, $\vartheta$, $\varphi$) and angle speed $\omega$. In one aspect, the data to the neural input node 712 may be captured by gyro-sensors equipped in the UE.

In one example aspect, the input layer 710 may also include a neural input node 714 for UE movement directions (x, y, z) and moving speed v. In one aspect, the data to the neural input node 714 may be captured by an accelerometer equipped in the UE.

In one example aspect, the input layer 710 may also include a neural input node 716 for historical serving/candidate Tx-Rx beam pair strengths and the corresponding index, angle-of-departure (AoD) and angle-of-arrival (AoA) of the beam pair. In one aspect, the data to the neural input node 716 may be captured by magnetic sensor equipped in the UE.

The neural input nodes 712, 714, and 716 are example neural input nodes and the input layer 710 may include other nodes in addition to or in place of the neural input nodes 712, 714, and 716.

The middle layer 720 may include a number of hidden neural nodes. In one example aspect, the middle layer 720 may include a UE rotation prediction node 722, a UE movement prediction node 724, a UE reflector information node 726, and a mapping node 728. Again, the hidden neural nodes 722, 724, 726, and 728 are example nodes and other nodes in addition to or in place of the hidden neural nodes 722, 724, 726, and 728 are certainly possible.

In one aspect, the UE rotation prediction node 722 may determine the rotation direction and speed of the UE and predict the UE location in the angle coordinate ($\theta$, $\vartheta$, $\varphi$) in coming subframes (SFs), based on the data from the neural input nodes 712, 714, and 716. In one aspect, the UE movement prediction node 724 may determine the moving direction and speed of UE and predict the UE location in the distance coordinate (x, y, z) in coming SFs, based on the data from the neural input nodes 712, 714, and 716.

In one aspect, the UE reflector information node 726 may determine if a candidate Tx-Rx beam pair has a LoS or an NLoS. If an NLoS, the UE reflector information node 726 may determine some information about a reflector. The reflector information is to provide relevant information regarding a reference point ("reflector") to compensate for lack of LoS for a beam pair. For example, trees, constructions, etc. in outdoor environment, and walls, windows, etc. in indoor environment may all serve as reflectors. The reflector information may include a predicted moving speed, a size, and/or a location of a reflector.

In one aspect, the, the mapping node 728 may map all angle information to one or more beam pair index for coming SFs, based on the data from the neural input nodes 712, 714, and 716. A beam pair index may allow the ANN to associate the acquired angel information (e.g., AoA and AoD) with a particular Tx-Rx beam pair.

The output layer 730 may include a number of output nodes. In one example aspect, the output layer 730 may include a good beam set prediction node 732, and a bad beam set prediction node 734. Again, the output nodes 732 and 734 are example output nodes and other output nodes in addition to or in place of the output nodes 732 and 734 are certainly possible.

The good beam set prediction node 732 may predict a set of good beam pairs and when the set of good beam pairs will become effective in coming SFs. A beam pair may be defined as a good beam pair when the beam pair either meets a predetermined beam strength threshold or is better than rest of the set of Tx-Rx beam pairs in terms of beam gain or some other measurements. The prediction of the set of good Tx-Rx beam pairs may be based in part on the learning that the ANN has acquired from training data and/or continuous feedback. Then the ANN may prioritize the set of good beam pairs accordingly, based on acquired learning, and a current round of measurements, by adjusting a weight associated with each of the set of good beam pairs.

The bad beam set prediction node 734 may predict a set of bad beam pairs and when the set of bad beam pairs will become effective in coming SFs. A beam pair may be defined as a bad beam pair when the beam pair either crosses a predetermined beam strength threshold or is worse than rest of the set of Tx-Rx beam pairs in terms of beam gain or some other measurements. The prediction of the set of bad Tx-Rx beam pairs may be based on the learning that the ANN has acquired from training data and/or continuous feedback. Then the ANN may prioritize the set of bad beam pairs accordingly, based on acquired learning, and a current round of measurements, by adjusting a weight associated with each of the set of bad beam pairs.

In one example aspect, the outputs from the middle layer 720 are acquired by applying learning to the outputs from the input layer 710. Additionally, the outputs from the output layer 730 are acquired by applying learning to the outputs from the middle layer. In one example aspect, as variations of all inputs at the input layer 710 may be slower than a small-scaling fading, a neural network such as the ANN described herein may provide a tractable solution to the beam prediction problem.

The ANN 700 may be triggered at various occasions. One such occasion is when the UE enters transmission range of the base station and just receives the Tx beams broadcast from the base station. Another occasion is when the UE's location has changed in a non-trivial way such that the current active or serving beam pair is no longer effective, and the performance of transmission of the serving beam pair has degraded beyond a predetermined threshold. A beam scheduler equipped with the ANN 700 may be able to find and track a good beam quickly, and in turn may decrease the latency for the UE to access the network.

Figure 8:
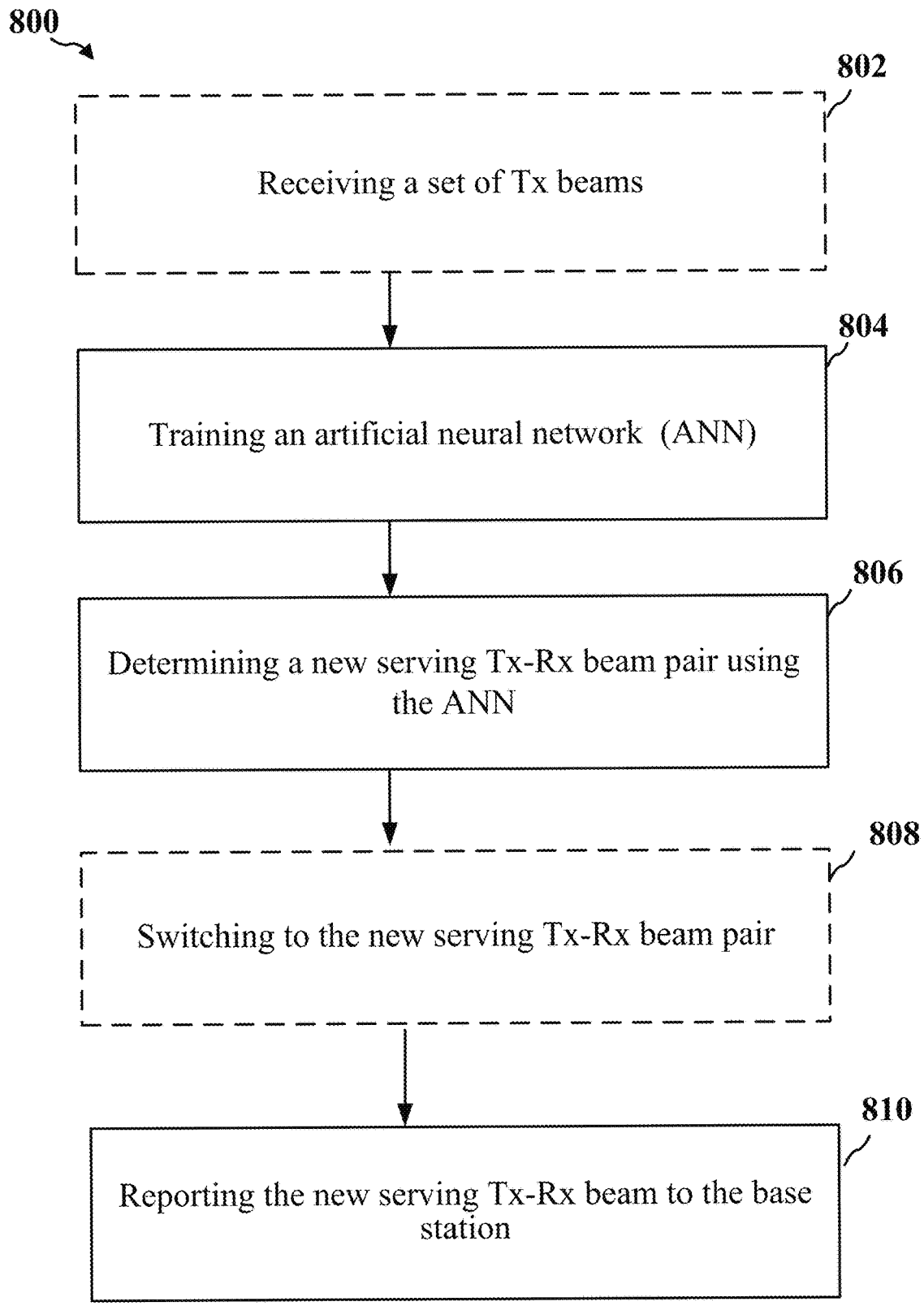
FIG. 8 is a flowchart of a method of wireless communication in accordance with one or more aspects of the present disclosure.

FIG. 8 is a flowchart of a method 800 of wireless communication in accordance with one or more aspects of the present disclosure. The method 800 may be performed by one of the UEs 104 of FIG. 1, the UE 350 of FIG. 3, the UE 604 of FIG. 6, or apparatus 1002/1002' of FIGS. 10 and 11. An optional step is indicated in a dashed boarder.

At 802, the method 800 may include receiving a set of Tx beams. The UE receives a set of Tx beams from a serving base station. The serving base station may transmit in a broadcast message the set of Tx beams available at the base station. This way, the Tx beams become known to all the UEs within the transmission range of the base station. In one example aspect, the UE pairs up a Tx beam with each of its Rx beams to form candidate Tx-Rx beam pairs for measurement. If the size of the Tx beam set is M and the size of Rx beam set if N, then the number candidate beam pairs is M×N.

At 804, the method 800 may include training an artificial neural network (ANN). The UE may train the ANN, such as the ANN 700 as shown in FIG. 7 and described in the corresponding sections. The training data may come from historical data of the ANN 700. The training may include feeding to the ANN a large amount of training data that is suitable for the target network on hand. The training data may be stored at the UE locally, at a cloud server, or a mix of the two.

Figure 9:
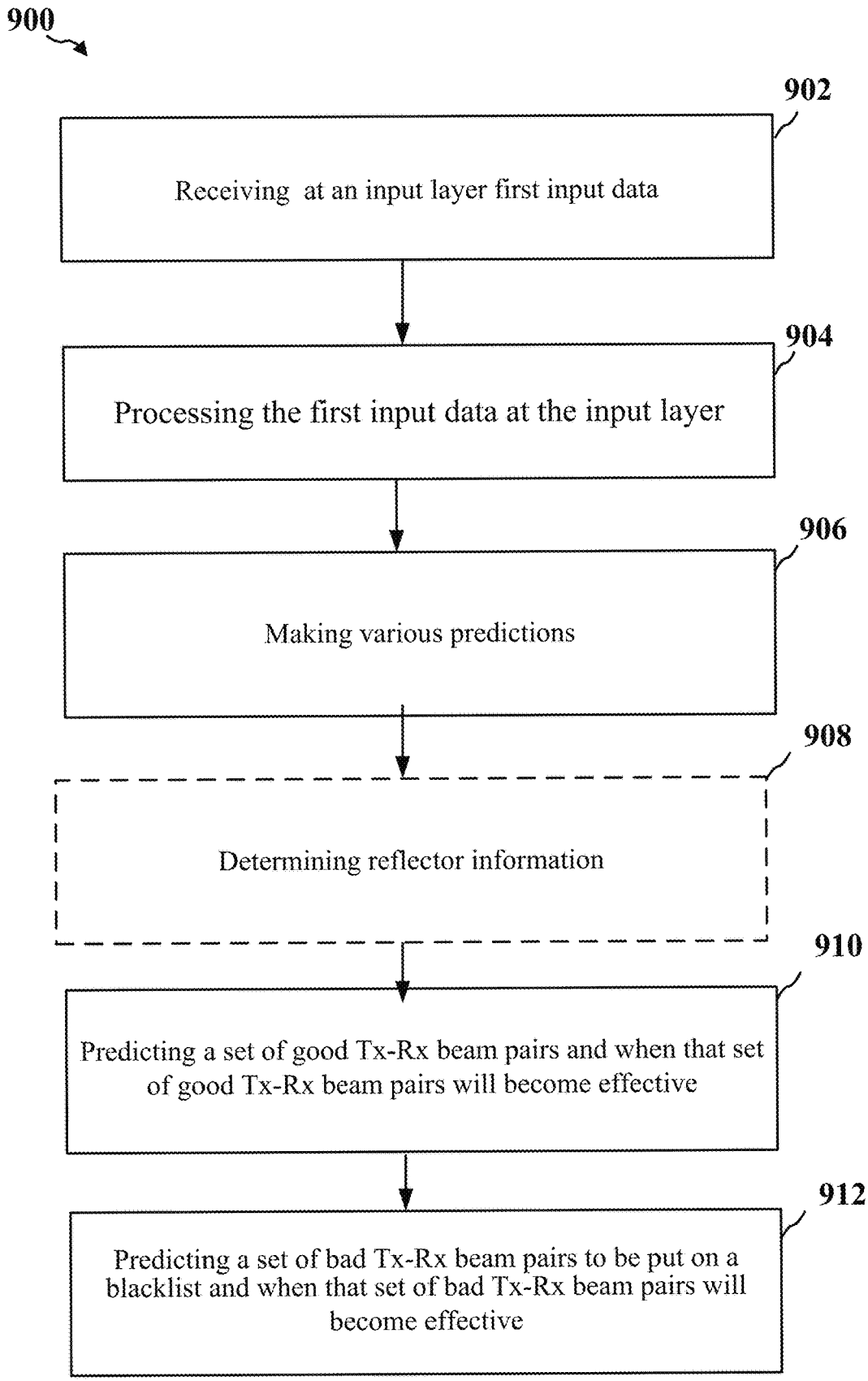
FIG. 9 is a flowchart of a method of wireless communication in accordance with one or more aspects of the present disclosure.

At 806, the method 800 may include determining a new serving Tx-Rx beam pair using the ANN. Details of using the ANN to determine one or more good Tx-Rx beam pairs are shown in FIG. 7 and FIG. 9 and described in the corresponding sections. In one example aspect, the ANN may predict a set of good beam pairs, rather than a single good beam pair as the new serving beam pair. In one example aspect, the UE may run the ANN multiple times to either narrow down the set of good beam pairs to a smaller number of beam pairs or to a single good beam pair. The UE then may determine a single new serving beam pair based on the outcome from the ANN.

At 808, the method 800 may include switching to the new serving Tx-Rx beam pair. The UE may switch to the newly determined serving Tx-Rx beam pair from the current Tx-Rx beam pair. In one example aspect, the newly determined Tx-Rx beam pair may be same as the current Tx-Rx beam pair. In this case, the step at 808 may be avoided. At 810, the UE reports the new serving beam pair to the base station and may start using the new serving Tx-Rx beam pair to communicate with the base station.

The method 800 may be triggered for various occasions. One such occasion is when the UE enters transmission range of the base station and just receives the Tx beams broadcast from the base station. Another occasion is when the UE's location has changed in a non-trivial way such that the current active or serving beam pair is no longer effective, after the performance of the current serving beam pair has degraded beyond a predetermined threshold.

The method 800 is for illustration purpose and shows one possible process for selecting candidate beam pairs for measurement and for selecting a new serving beam pair. In practice, one or more steps shown in illustrative method 800 may be combined with other steps, performed in any suitable order, performed in parallel (e.g., simultaneously or substantially simultaneously), or removed. For example, reporting the new active Tx-Rx beam pair at 810 may be performed in parallel to or before switching to the new serving beam pair at 808.

FIG. 9 is a flowchart of a method 900 of wireless communication in accordance with one or more aspects of the present disclosure. The method 900 may be performed by one of the UEs 104 of FIG. 1, the UE 350 of FIG. 3, the UE 604 of FIG. 6, or apparatus 1002/1002' of FIGS. 10 and 11. The method 900 is a part of the process for determining a new serving Tx-Rx beam pair. An optional step is indicated in a dashed boarder.

At 902, the method 900 includes receiving at an input layer of the artificial neural network (ANN) first input data. The input layer may receive as the first input data at least a set of UE self-rotation angles, a set of UE angle speeds, a set of UE movement directions, a set of UE moving speeds, an angle of departure (AoD), an angle of arrival (AoA), and historical beam pair strengths and corresponding index for each of the set of candidate Tx-Rx beam pairs.

The input layer may receive the first input data from various sensors equipped in the UE. For example, the data related to the self-rotation angles of the UE and the set of UE angle speeds, may be captured by one or more gyro-sensors equipped in the UE. The UE movement directions and moving speed related data may be captured by an accelerometer equipped in the UE. Additionally, the data related to historical serving/candidate Tx-Rx beam pair strength and the corresponding index, Angle-of-departure (AoD) and Angle-of-Arrival (AoA) may be captured by one or more magnetic sensors equipped in the UE.

At 904, the method 900 includes processing the first input data at the input layer. The input layer of the ANN may process the first input data by filtering, sorting and/or summarizing raw data received from the various sensors, as described above. In one aspect, the repetitive data may be filtered out and summarized. Similar data may be categorized and organized in a fashion that may facilitate further processing and manipulation by the ANN. Then, the processed first input data is fed into a middle layer of the ANN.

At 906, the method 900 includes making various predictions. The middle layer of the ANN may make a UE rotation prediction, a UE movement prediction, and a determination of whether the Tx-Rx beam pair has a line of sight (LoS) or Non LoS (NLoS) between the Tx-Rx beam pair. The predictions are made based on the processed first input data from the input layer, as described above.

At 908, the method 900 includes determining reflector information. The middle layer of the ANN may determine the reflector information when the middle layer of the artificial neural network determines there is a NLoS between the Tx-Rx beam pair. As described above, the reflector information is to provide relevant information regarding a reference point ("reflector") to compensate for lack of LoS for the beam pair. The reflector information may include a predicted moving speed, a size, and/or a location of the reflector. If there is a LoS between the beam pair, the step at 908 may be avoided. The various prediction and/or the reflector information is fed into an output layer of the ANN.

At 910, the method 900 includes predicting a set of good Tx-Rx beam pairs. The output layer of the ANN may predict the set of good Tx-Rx beam pairs and when the predicted set of good Tx-Rx beam pairs will become effective in coming subframes. In one aspect, predicting the set of good Tx-Rx beam pairs may include anticipating the set of Tx-Rx beam pairs will become good beam pairs in a near future such as next n subframes, even before some of the set of beam pairs have become good beam pairs. A beam pair may be defined as a good beam pair when the beam pair either meets a predetermined beam strength threshold or is better than rest of the set of Tx-Rx beam pairs in terms of beam gain or some other measurements. The prediction of the set of good Tx-Rx beam pairs may be based on the learning that the ANN has acquired from training data and continuous feedback from the ANN, if appropriate.

At 912, the method 900 includes predicting a set of bad Tx-Rx beam pairs. The output layer of the ANN may predict the set of bad beam pairs to be placed on a blacklist. The blacklist is used to decrease the size of the beam pair pool for determining a new serving Tx-Rx beam pair. A beam pair may be defined as a bad beam pair when the beam pair either crosses a predetermined beam strength threshold or is worse than rest of the set of Tx-Rx beam pairs in terms of beam gain or some other measurements. The output layer may also predict when the set of bad Tx-Rx beam pairs will become effective in coming subframes. Similarly, the prediction of the set of bad Tx-Rx beam pairs may be based on the learning that the ANN has acquired from training data and feedback from the ANN, if appropriate.

The method 900 may be run multiple times to converge on a small set of good beam pairs or a single good beam pair that may become the new serving Tx-Rx beam pair. Each time the method 900 is run, the size of the good beam pair pool is decreased by the size of predicted set of bad Tx-Rx beam pairs. The ANN, such as the one shown in FIG. 7, may determine and adjust the number of times that the method 900 is run to converge on the new serving Tx-Rx beam pair.

The method 900 may be triggered for various occasions. One such occasion is when the UE enters transmission range of the base station and just receives the Tx beams broadcast from the base station. Another occasion is when the UE's location has changed in a non-trivial way such that the current active or serving beam pair is no longer effective, after the performance of the current serving beam pair has degraded beyond a predetermined threshold.

The method 900 is for illustration purpose and shows one possible process for predicting a new serving beam pair using an artificial neural network. In practice, one or more steps shown in illustrative method 900 may be combined with other steps, performed in any suitable order, performed in parallel (e.g., simultaneously or substantially simultaneously), or removed. For example, predicting the set of good beam pair at 910 may be performed after or in parallel to predicting the set of bad beam pair at 912.

Figure 10:
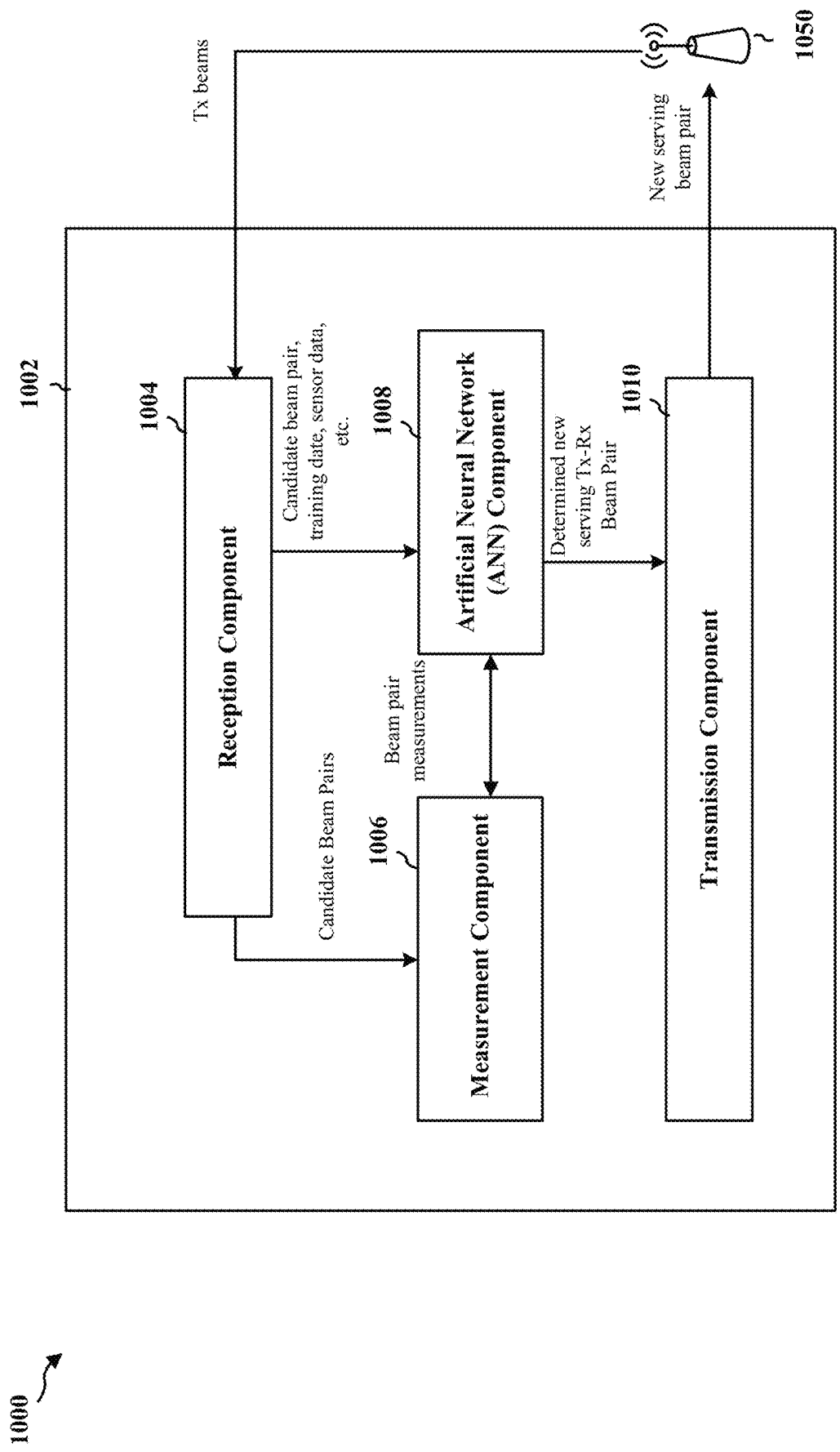
FIG. 10 is a conceptual data flow diagram illustrating the data flow between different means/components in an exemplary apparatus in accordance with one or more aspects of the present disclosure.

FIG. 10 is a conceptual data flow diagram 1000 illustrating the data flow between different means/components in an exemplary apparatus 1002. The apparatus may be a mmW capable UE in communication with a base station. The apparatus includes a reception component 1004 that is configured to receive data and control information from the base station. For example, the reception component 1004 of the mmW capable UE may receive a set of Tx beams from the base station in a broadcast message. Additionally, the reception component 1004 may also receive sensor data from various sensors equipped in the UE and ANN training data set from other input device.

The apparatus 1002 also includes a measurement component 1006 that receives candidate beam pairs from the reception component 1004, and measure the received beam pairs. The apparatus 1002 also includes an ANN component 1008 that receive beam pairs from the reception component 1004, the measurements from beam pair measurement component 1006, and training data and sensor data from the reception component 1004. The ANN component 1008 may predict a set of good beam pairs and a set of bad beam pairs, based in part on the measurement and acquired learning of the ANN component. The ANN component 1008 itself may also run the ANN multiple times to converge on one new serving Tx-Rx beam pair based on the predicted set of good beam pairs. The apparatus 1002 further includes the transmission component 1010 that transmits the determined new serving Tx-Rx beam pair to the base station 1050.

The apparatus may include additional components that perform each of the blocks of the algorithm in the aforementioned flowcharts of FIGS. 6, 8, and 9. As such, each block in the aforementioned flowcharts of FIGS. 6, 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
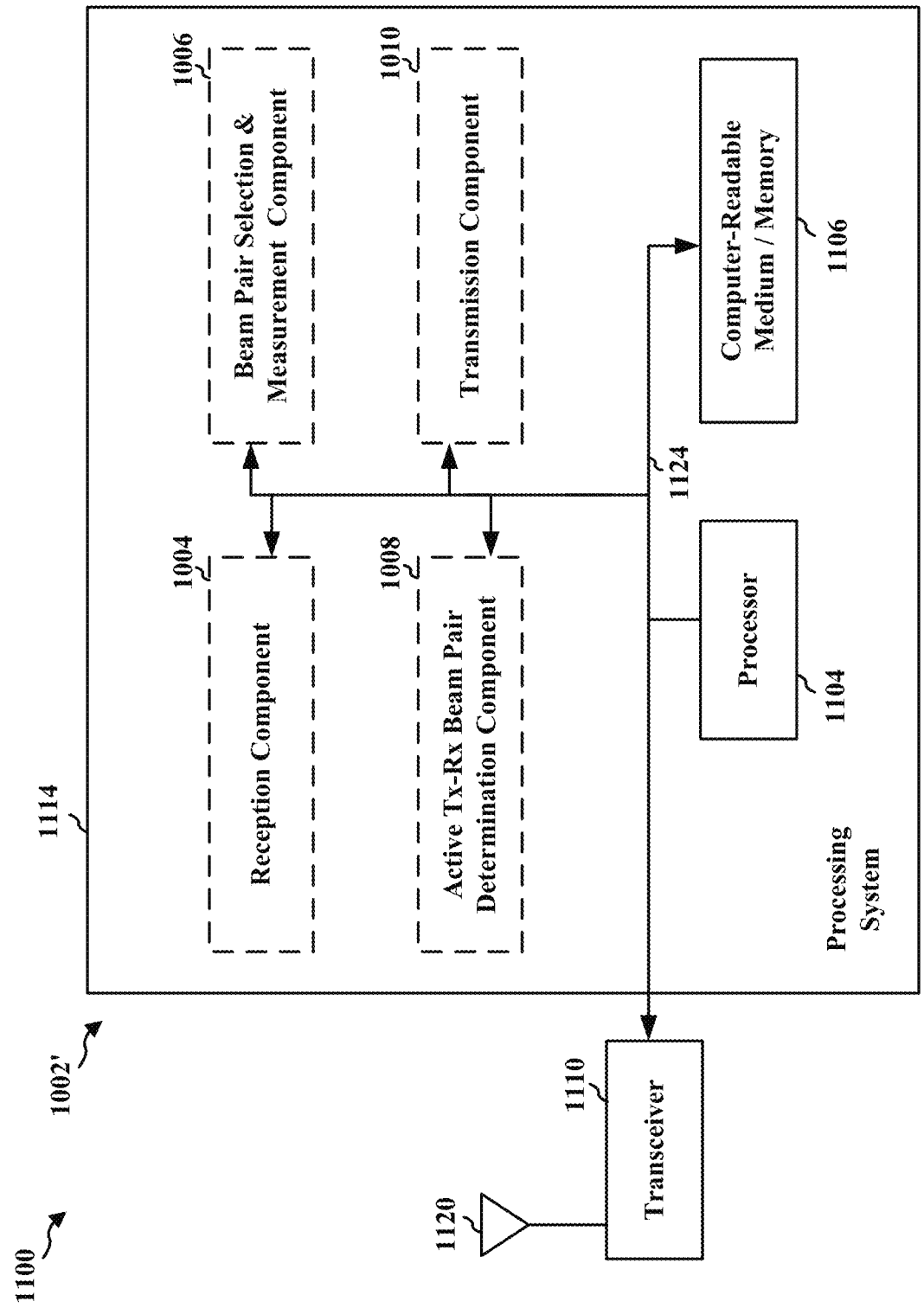
FIG. 11 is a diagram illustrating an example of a hardware implementation for an apparatus employing a processing system in accordance with one or more aspects of the present disclosure.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the transmission component 1010. In addition, the transceiver 1110 receives information from the processing system 1114, specifically the reception component 1004, and based on the received information, generates a signal to be applied to the one or more antennas 1120.

The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, and 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   determining, by the UE, a new serving Transmit (Tx)-Receive (Rx) beam pair among a plurality of Tx-Rx beam pairs, based in part on a predicted set of good Tx-Rx beam pairs, predicted set obtained using an artificial neural network; and
   switching to the new serving Tx-Rx beam pair,
   wherein the artificial neural network is trained at the UE with first input data comprising at least a set of UE self-rotation angles, a set of UE angle speeds, a set of UE movement directions, a set of UE moving speeds, an angle of departure (AoD), and an angle of arrival (AoA).

2. The method of claim 1, further comprising at least one of:
   receiving a set of Tx beams from a serving base station, wherein each of Tx beam is paired with each of Rx beams available at the UE to form the plurality of Tx-Rx beam pairs; or
   training the artificial neural network with a set of historical first input data prior to determining the new serving Tx-Rx beam pair, wherein the artificial neural network comprises an input layer, a middle layer, and an output layer; or
   a combination thereof.

3. The method of claim 2, wherein the input layer of the artificial neural network is configured to receive as the first input data at least the set of UE self-rotation angles, the set of UE angle speeds, the set of UE movement directions, the set of UE moving speeds, the set of angle of departure (AoD), the set of angle of arrival (AoA), historical beam pair strengths, a corresponding index for each of the plurality of Tx-Rx beam pairs, or a combination thereof.

4. The method of claim 3, wherein the input layer is further configured to receive the first input data from one or more sensors of the UE, and to process the first input data by filtering, sorting, summarizing the first input data, or a combination thereof.

5. The method of claim 4, wherein the middle layer of the artificial neural network is configured to receive as second input data the processed first input data.

6. The method of claim 5, wherein the middle layer of the artificial neural network is further configured to make, based in part on the second input data, a UE rotation prediction, a UE movement prediction, and a determination of whether a Tx-Rx beam pair has a line of sight (LoS) or Non LoS (NLoS) between the Tx-Rx beam pair, or a combination thereof.

7. The method of claim 6, wherein the middle layer of the artificial neural network is further configured to determine reflector information comprising a predicted moving speed, a size, and a location of a reflector, when the middle layer of the artificial neural network determines there is a NLoS between the Tx-Rx beam pair.

8. The method of claim 7, wherein the output layer of the artificial neural network is configured to receive, as third input data, the UE rotation prediction, the UE movement prediction, the determination of whether the Tx-Rx beam pair has a line of sight (LoS) or Non LoS (NLoS), the reflector information, or a combination thereof.

9. The method of claim 8, wherein the output layer is further configured to predict the set of good Tx-Rx beam pairs and when the set of good Tx-Rx beam pairs will become effective, based in part on the third input data, and wherein the set of good Tx-Rx beam pairs either meet a predetermined beam strength threshold or are better than rest of the plurality of Tx-Rx beam pairs.

10. The method of claim 9, wherein the output layer is further configured to predict a set of bad Tx-Rx beam pairs and when that the predicted set of bad Tx-Rx beam pairs will become effective based on the third input data, and wherein the set of bad Tx-Rx beam pairs either crosses a predetermined beam strength threshold or is worse than rest of the plurality of Tx-Rx beam pairs.

11. The method of claim 10, wherein the determining of the new serving Tx-Rx beam pair further comprises
placing the predicted set of bad beam pairs on a blacklist to decrease a size of the set of good Tx-Rx beam pairs; and
determining the new serving Tx-Rx beam pairs based on a smaller set of good Tx-Rx beam pairs.

12. The method of claim 1, wherein the artificial neural network is one of a feedforward artificial neural network, a feedback artificial neural network, or a combination thereof.

13. An apparatus for wireless communication at a user equipment (UE), comprising:
means for determining a new serving Transmit (Tx)-Receive (Rx) beam pair among a plurality of Tx-Rx beam pairs, based in part on a predicted set of good Tx-Rx beam pairs, the predicted set obtained using an artificial neural network; and
means for switching to the new serving Tx-Rx beam pair, wherein the artificial neural network is trained at the UE with first input data comprising at least a set of UE self-rotation angles, a set of UE angle speeds, a set of UE movement directions, a set of UE moving speeds, an angle of departure (AoD), and an angle of arrival (AoA).

14. The apparatus of claim 13, further comprising at least one of:
means for receiving a set of Tx beams from a serving base station, wherein each of Tx beam is paired with each of Rx beams available at the UE to form the plurality of Tx-Rx beam pairs; or
means for training the artificial neural network with a set of historical first input data prior to determining the new serving Tx-Rx beam pair, wherein the artificial neural network comprises an input layer, a middle layer, and an output layer; or
a combination thereof.

15. The apparatus of claim 14, wherein the input layer of the artificial neural network is configured to receive as the first input data at least the set of UE self-rotation angles, the set of UE angle speeds, the set of UE movement directions, the set of UE moving speeds, the set of angle of departure (AoD), the set of angle of arrival (AoA), historical beam pair strengths, a corresponding index for each of the plurality of Tx-Rx beam pairs, or a combination thereof.

16. The apparatus of claim 14, wherein the input layer is further configured to receive the first input data from one or more sensors of the UE, and to process the first input data by filtering, sorting, summarizing the first input data, or a combination thereof.

17. The apparatus of claim 16, wherein the middle layer of the artificial neural network is configured to receive as second input data the processed first input data.

18. The apparatus of claim 17, wherein the middle layer of the artificial neural network is further configured to make, based in part on the second input data, a UE rotation prediction, a UE movement prediction, and a determination of whether a Tx-Rx beam pair has a line of sight (LoS) or Non LoS (NLoS) between the Tx-Rx beam pair, or a combination thereof.

19. The apparatus of claim 18, wherein the middle layer of the artificial neural network is further configured to determine reflector information comprising a predicted moving speed, a size, and a location of a reflector, when the middle layer of the artificial neural network determines there is a NLoS between the Tx-Rx beam pair.

20. The apparatus of claim 19, wherein the output layer of the artificial neural network is configured to receive, as third input data, the UE rotation prediction, the UE movement prediction, the determination of whether the Tx-Rx beam pair has a line of sight (LoS) or Non LoS (NLoS), the reflector information, or a combination thereof.

21. The apparatus of claim 20, wherein the output layer is further configured to predict the set of good Tx-Rx beam pairs and when the set of good Tx-Rx beam pairs will become effective, based in part on the third input data, and wherein the set of good Tx-Rx beam pairs either meet a predetermined beam strength threshold or are better than rest of the plurality of Tx-Rx beam pairs.

22. The apparatus of claim 21, wherein the output layer is further configured to predict a set of bad Tx-Rx beam pairs and when that the predicted set of bad Tx-Rx beam pairs will become effective based on the third input data, and wherein the set of bad Tx-Rx beam pairs either crosses a predetermined beam strength threshold or is worse than rest of the plurality of Tx-Rx beam pairs.

23. The apparatus of claim 22, wherein the means for determining of the new serving Tx-Rx beam pair further comprises
placing the predicted set of bad beam pairs on a blacklist to decrease a size of the set of good Tx-Rx beam pairs; and
determining the new serving Tx-Rx beam pairs based on a smaller set of good Tx-Rx beam pairs.

24. An apparatus for wireless communication, comprising:
a transceiver;
a memory; and
at least one processor coupled to at least one of the memory and configured to:
determine a new serving Transmit (Tx)-Receive (Rx) beam pair among a plurality of Tx-Rx beam pairs, based in part on a predicted set of good Tx-Rx beam pairs, the predicted set obtained using an artificial neural network; and
switch to the new serving Tx-Rx beam pair,
wherein the artificial neural network is trained at the UE with first input data comprising at least a set of UE self-rotation angles, a set of UE angle speeds, a set of UE movement directions, a set of UE moving speeds, an angle of departure (AoD), and an angle of arrival (AoA).

25. The apparatus of claim 24, wherein the at least one processor is further configured to at least perform one of:
means for receiving a set of Tx beams from a serving base station, wherein each of Tx beam is paired with each of Rx beams available at a user equipment (UE) to form the plurality of Tx-Rx beam pairs, wherein the apparatus comprises the UE; or means for training the artificial neural network with a set of historical first input data prior to determining the new serving Tx-Rx beam pair, wherein the artificial neural network comprises an input layer, a middle layer, and an output layer; or a combination thereof.

26. The apparatus of claim 25, wherein the input layer of the artificial neural network is configured to receive as the first input data at least the set of UE self-rotation angles, the set of UE angle speeds, the set of UE movement directions, the set of UE moving speeds, the set of angle of departure (AoD), the set of angle of arrival (AoA), historical beam pair strengths, a corresponding index for each of the plurality of Tx-Rx beam pairs, or a combination thereof.

27. The apparatus of claim 26, wherein the input layer is further configured to receive the first input data from one or more sensors of the UE, and to process the first input data by filtering, sorting, summarizing the first input data, or a combination thereof.

28. The apparatus of claim 27, wherein the middle layer of the artificial neural network is further configured to make, based in part on the processed input data, a UE rotation prediction, a UE movement prediction, and a determination of whether a Tx-Rx beam pair has a line of sight (LoS) or Non LoS (NLoS) between the Tx-Rx beam pair, or a combination thereof.

29. The apparatus of claim 28, wherein the middle layer of the artificial neural network is further configured to determine reflector information comprising a predicted moving speed, a size, and a location of a reflector, when the middle layer of the artificial neural network determines there is a NLoS between the Tx-Rx beam pair.

30. The apparatus of claim 29, wherein the output layer is configured to predict the set of good Tx-Rx beam pairs and when the set of good Tx-Rx beam pairs will become effective, based in part on the UE rotation prediction, the UE movement prediction, the determination of whether a Tx-Rx beam pair has a line of sight (LoS) or Non LoS (NLoS) between the Tx-Rx beam pair, reflector information, or a combination thereof; and predict a set of bad Tx-Rx beam pairs and when that the predicted set of bad Tx-Rx beam pairs will become effective, based in part on the UE rotation prediction, the UE movement prediction, the determination of whether a Tx-Rx beam pair has a line of sight (LoS) or Non LoS (NLoS) between the Tx-Rx beam pair, reflector information, or a combination thereof.

* * * * *